United States Patent [19]

Clancey

[11] Patent Number: 4,936,434

[45] Date of Patent: Jun. 26, 1990

[54] VISCOUS DAMPER WITH MEANS PREVENTING SIDEWALL DEFLECTION

[75] Inventor: Stephen M. Clancey, Battle Creek, Mich.

[73] Assignee: Eaton Corporation, Cleveland, Ohio

[21] Appl. No.: 257,258

[22] Filed: Oct. 12, 1988

[51] Int. Cl.$^5$ ............ F16D 47/02; F16D 35/00
[52] U.S. Cl. ............ 142/106.2; 192/58 B; 464/24
[58] Field of Search ............ 192/58 B, 106.1, 106.2; 464/24

[56] References Cited

U.S. PATENT DOCUMENTS

| 2,316,820 | 4/1983 | Thelander | 192/106.2 |
| 2,513,379 | 7/1950 | Thelander | 192/106.2 |
| 4,601,676 | 7/1986 | Tojima | 464/64 |
| 4,739,866 | 4/1988 | Reik et al. | 192/106.2 |
| 4,782,932 | 11/1988 | Janson | 192/70.17 |
| 4,790,792 | 12/1988 | Bopp | 192/58 B |
| 7,608,883 | 9/1986 | Bupp | 464/24 |

FOREIGN PATENT DOCUMENTS 223442A  5/1987  European Pat. Off. ......... 192/106.2

OTHER PUBLICATIONS

E. S. Bower, Design Practices–Passenger Car Automatic Transmissions, 1962, pp. 365 and 371.

*Primary Examiner*—Leslie A. Braun
*Assistant Examiner*—Nicholas Whitelaw
*Attorney, Agent, or Firm*—P. S. Rulon

[57] ABSTRACT

A clutch plate assembly (24) for a vehicle driveline includes a spring damping mechanism disposed in a parallel with a viscous shear damper mechanism (30) for damping spring recoil. The spring damping mechanism includes a set of pairs of relatively high rate helical compression springs (34,36) for transmitting torque and attenuating torsionals when a transmission input shaft (22) is connected to a load and a set of relatively low rate helical compression springs (38) connected in series with the high rate spring (34,36) for attenuating torsionals when the shaft (22) is not connected to a load. The viscous damper mechanism includes an annular housing (48) having first and second radially extending sidewalls (52,54) defining a compartment (48a) having a clutch assembly (50) disposed therein for viscous clutching coaction via a viscous shear oil. An inner member (58) of the clutch assembly (50) includes a dynamic seal assembly (66 or 72) molded integral therewith for sealing the inner extent of the compartment (48a). The inner extent of the housing includes a plurality of fasteners (56e) structurally interconnecting the inner extent of the sidewalls (52,54) to prevent relative axial movement of the sidewalls due to centrifugal effects. The housing sidewalls (52,54), and the clutch and seal assemblies are formed to facilitate a method for readily assembling and accurately filling the damper with viscous shear oil.

19 Claims, 3 Drawing Sheets

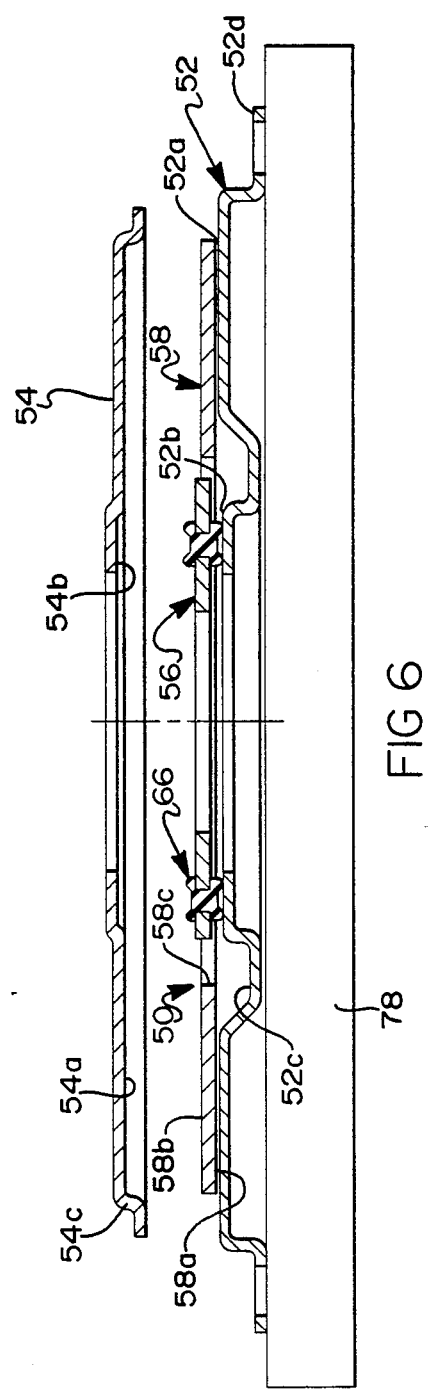
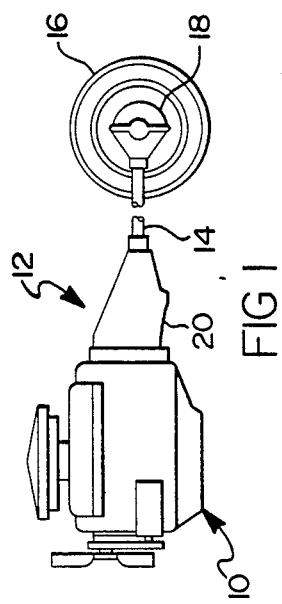
FIG 6
FIG 1

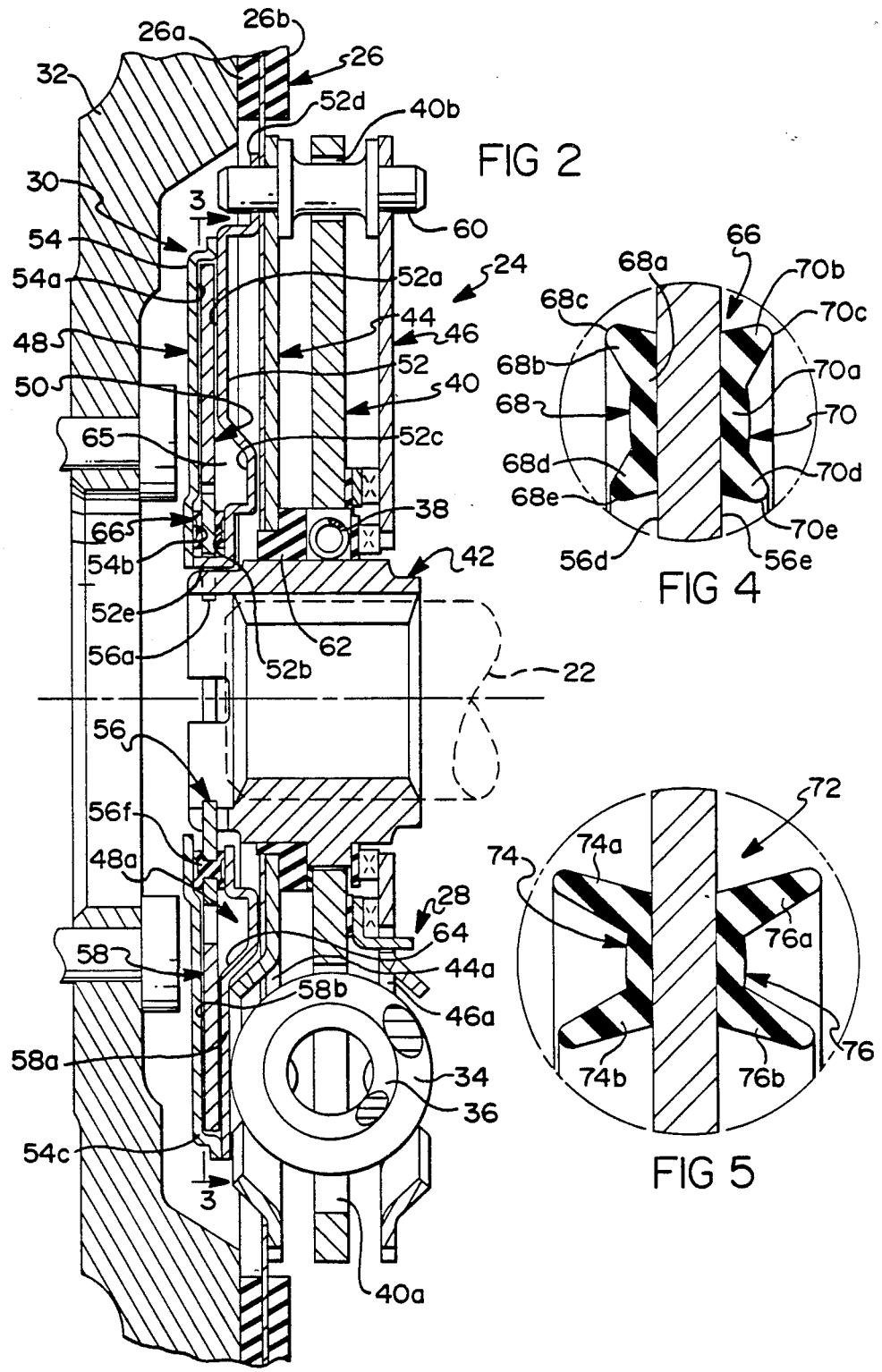

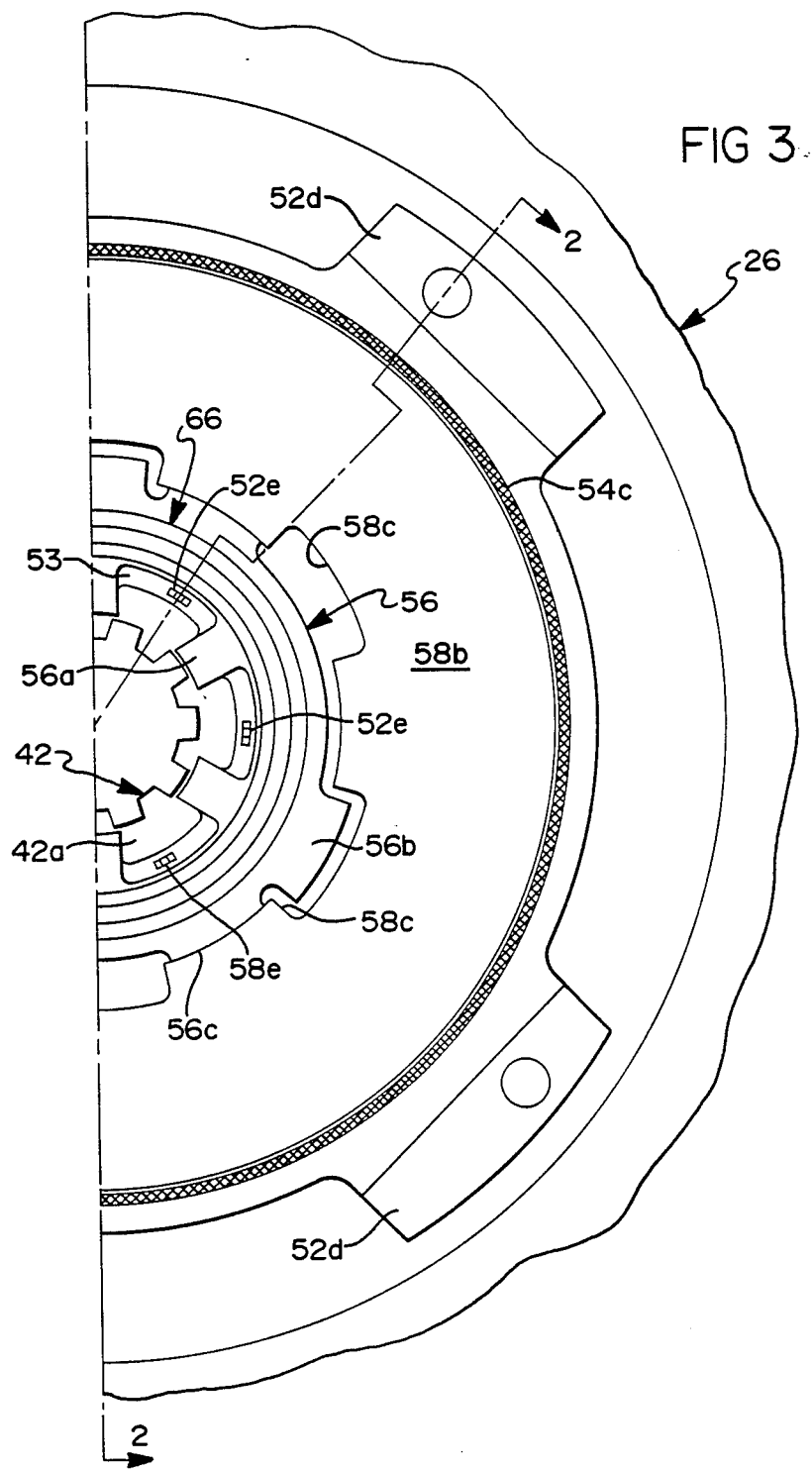

VISCOUS DAMPER WITH MEANS PREVENTING SIDEWALL DEFLECTION

CROSS-REFERENCE TO RELATED APPLICATIONS

The invention of this aplications relates to U.S. application Ser. No. 793,802, filed November 1, 1985; to U.S. application Ser. No. 256,690, filed October 12, 1988; and to U.S. application Ser. No. 256,816, filed Oct. 12, 1988. These applications are asigned to the asignee of this application.

FIELD OF THE INVENTION

This invention relates to torsional vibration damping mechanisms. More specifically, this invention relates to a viscous damper module for damping the rate of spring recoil in a torsion vibration damping mechanism.

BACKGROUND OF THE INVENTION

Torsional vibration damping mechanisms have long been used to reduce the adverse effects of torsional vibrations or fluctuating torques in vehicle drivelines. Such torsional vibrations or fluctuating torques, hereinafter referred to as torsionals, emanate primarily from engine power pulses and torque spikes, and from abrupt changes in driveline torque due primarily to rapid engine acceleration/deceleration and transmission ratio changes.

Most known, prior art torsional vibration damping mechanisms have employed springs disposed in parallel with a mechanical friction device. A well known and basic type of such mechanism has comprised plate like members mounted for limited relative rotation, a set of helical compression springs interconnecting the members and a mechanical friction device responsive to relative rotation of the members. Driveline torque is normally transmitted by the helical springs and flexing of the springs attenuates or reduces the potential amplitude of the driveline torsionals. The mechanical friction device dampens or reduces the rate of spring recoil. When the amplitude of the torsionals is less than the breakaway torque of the friction device, spring flexing does not occur and the torsionals are transmitted without benefit of attenuation.

It is also known to employ flat spiral wound or helical compression springs in parallel with a viscous coupling or damper mechanism, as may be seen by reference to U.S. Pat. Nos. 4,608,883 and 4,601,676, respectively, which are incorporated herein by reference. Since a liquid is the clutching medium within a viscous damper, the problem of breakaway torque associated with mechanical friction devices is in theory eliminated. However, such viscous dampers have been difficult to fit into the limited space available in vehicle dirvelines and when reduced to sizes that fit in the limited space available, they have been difficult to assemble and properly fill with viscous shear oil, and they have required costly and/or bulky dynamic seal to eliminate seal drag torque.

SUMMARY OF THE INVENTION

An object of this invention is to provide means for reducing axial separation of the sidewalls of a viscous coupling or damper due to centrifugal effects.

According to a feature of the invention, a torsion damping mechanism is adapted for connection between input and output drives of a torque transmitting driveline. The mechanism includes a spring damper for transmitting torque between the drives and a viscous damper including annular housing and clutch assemblies adapted for rotation about the rotational axis of one of the drives. The housing assembly includes first and second radially extending sidewalls having mutually facing sidewall surfaces defining an annular radially extending compartment open at its radially inner extent and closed at its radially outer extent by means sealingly securing the sidewalls together, the housing being adapted to be driven by the other drive. The clutch assembly includes radially outer and inner portions, the outer portion having oppositely facing radially extending surfaces disposed in close axially spaced relation from the sidewall surfaces for viscous clutching coaction therewith via a viscous liquid in the compartment, and the inner portion extending radially inward of the housing for driving connection to the one drive. A dynamic seal assembly cooperates between the clutch inner portion and radially inner portion of the housing sidewalls for sealing the radially inner extent of the compartment. The damper is characterized by the clutch assembly including a plurality circumferentially spaced apart openings extending therethrough and the housing assembly includes a plurality of fasteners freely extending through said openings and having opposite ends fixed to the housing sidewalls for preventing axial movement of the sidewalls relative to each other, the circumferentially spaced apart openings having an arc length allowing a predetermined amount of relative rotation between the housing and clutch assemblies.

BRIEF DESCRIPTION OF THE DRAWINGS

The torsional damping mechanism of the present invention is shown in the accompanying drawings in which:

FIG. 1 is a schematic view of a motor vehicle driveline;

FIG. 2 is a detailed, sectional view of the mechanism looking along line 2—2 of FIG. 3;

FIG. 3 is a detailed, sectional view of a viscous damper of the mechanism looking along line 3—3 of FIG. 2;

FIG. 4 is an enlarged sectional view of a portion of a seal in the mechanism;

FIG. 5 is an enlarged sectional view of a portion of an alternative seal; and

FIG. 6 is a sectional view of the viscous damper illustrating a method of assembling and filling the damper with a viscous shear liquid.

DETAILED DESCRIPTION OF THE DRAWINGS

The motor vehicle driveline seen schematically in FIG. 1 includes a prime mover 10 and a transmission 12 having an output shaft 14 drivingly connected to a load such as a ground engaging wheel 16 via a differential gear assembly 18 for rear and/or front axles of a vehicle. Prime mover 10 is preferably of the internal, periodic combustion type but may be any type of power plant having torque characteristics that are improved by a torsional vibration damping mechanism. Transmission 12 includes a housing 20 containing a plurality of unshown, constant mesh ratio gears or ratio change mechanisms driven by a tranmission input shaft or drive 22 partially shown in FIG. 2. Well-known ratio change devices or clutches within the transmission are employed to selectively (i.e., manually or automatically) put the transmission in a neutral position wherein the input shaft 22 is not connected to the load or in-gear positions wherein the input shaft is connected to the load.

Looking now at FIGS. 2 and 3, therein is illustrated an annular clutch plate assembly 24 disposed for rotation about the axis of transmission input shaft 22. Clutch plate assembly 24 includes a partially shown annular friction ring 26 in driving relation with shaft 22 via a spring damping mechanism 28 positioned radially between the friction ring and shaft 22 and disposed in parallel with a viscous shear damper mechanism 30. The friction ring includes oppositely facing friction surfaces 26a,26b frictionally connectable to a partially shown engine flywheel 32 in response to selective axial movement of an unshown pressure plate in well-known manner.

The spring damper mechanism 28, which is well-known in the prior art, includes a first set of pairs of springs 34,36 for transmitting full driveline torque, a set of gear anti-rattle springs 38, an intermediate member 40, a hub 42 slidably splined to drive 22, and a support structure including annular side plates 44,46. The viscous damper mechanism 30 or module includes annular housing and clutch assemblies 48,50. Housing assembly 48 includes first and second radially extending sidewalls 52,54 and clutch assembly 50 includes radially inner and outer members 56,58. The sidewalls define an annular radially extending compartment 48a closed at its radially outer extent, open at its radially inner extent and having the clutch assembly inner and outer members disposed therein. Side plates 44,46 of the support structure are rigidly secured together by a plurality of pins 60. The pins also rigidly secure friction ring 26 and viscous damper housing assembly 48 to the support structure. The ends of the pins are peened over when assembly is complete. Intermediate member 40 includes a plurality of circumferentially spaced apart openings 40a each receiving a pair of springs 34,36. The springs are also received by an equal number of pairs of circumferentially spaced apart openings 44a,46a in side plates 44,46. Radially extending ends of openings 40a,44a,46a react against the springs and connect the spring sets in series. Side plate 44 is journaled on hub 42 by a plastic bushing 62, intermediated member 40 is loosely splined to hub 42 in the circumferential direction. Anti-rattle springs 38 resist the free play between the unshown splines of member 40 and hub 42. Pins 60 pass through arcuate, circumferentially extending slots 40b in intermediate member 40 to allow friction ring 26, side plates 44,46 and viscous damper housing assembly 48 to rotate as a unit relative to intermediate member 40 and hub 42 in response to flexing of the springs 34,36,38.

The viscous damper inner clutch member 56 includes splines 56a which mate with splines 42a of the hub, whereby a given relative rotation between friction ring 26 and hub 42 provides an equal relative rotation between viscous damper housing assembly 48 and inner clutch member 56. Housing assembly 48 and clutch assembly 50 define closely spaced apart shear surfaces which are in clutching coaction via viscous shear liquid therebetween. The viscous shear liquid is of high viscosity and is preferably a silicone oil, for example dimethyl polysiloxane. The actual viscosity depends on driveline application, area and spacing of the housing and clutch surfaces, mean radius of the surface areas, etc.

Looking now at viscous damper mechanism 30 in greater detail, annular housing and clutch assemblies 48,50 are formed of stampings and therefore are relatively inexpensive to manufacture since they require little or no machining. Further, damping mechanism 30 is designed to facilitate installation in a limited available space, rapid and accurate assembly in production, and rapid and accurate filling with viscous shear liquid during assembly.

With respect to housing assembly 48, first sidewall 52 includes a radially outer portion defining a flat, annular shear surface 52a, a radially inner portion defining a flat, annular seal surface 52b, an annular bulge 52c, and a plurality of tabs or feet 52d secured to pins 60 as previously mentioned. First sidewall 52 also includes a plurality of axially extending, circumferentially spaced apart tabs or fingers 52e explained further hereinafter. Sidewall 54 includes a radially outer portion defining a flat, annular shear surface 54a, a radially inner portion defining a flat, annular seal surface 54b, and an annular axially extending spacer flange 54c sealingly secured to a radially outer extent of shear surface 52a and having an axial length defining the axial distance between shear surfaces 52a,54a.

With respect of clutch assembly 50, outer clutch member 58 includes axially oppositely facing, flat, annular shear surfaces 58a,58b which are closely spaced from the sidewall shear surfaces 52a,54a to form a viscous shear chamber 64, generally bounded in the radial direction by spacer flange 54c and the radially outer periphery of annular bulge 52c. The remainder of compartment 48a defines a reservoir chamber 65. The inner periphery of outer member 58 is drivingly connected to the outer periphery of inner member 56 via tabs 56b which are received by half of recesses 58c. Herein, the arcuate length of recesses 58a is greater than that of tabs 56b to allow rotational free play or lost motion therebetween. Alternatively, the free play may be deleted; however, the mating of the tabs and recesses preferably allows axial movement of the member relative to each other for purposes explained hereinafter. Inner clutch member 56 includes, in addition to splines or tabs 56a,56b, a plurality of arcuate surfaces 56c of equal radius journaling the outer member thereon and a dynamic face seal assembly 66 integral with the inner member. The seal assembly is partially shown enlarged in FIG. 4. Dynamic seal, as used herein, means a seal having a portion in sealing relation with a relatively movable surface.

The seal assembly includes symmetrical face seals 68, 70 each having a base portion 68a, 70a sealingly affixed to axially oppositely facing surfaces 56d, 56e of the inner clutch member, an axially and radially inwardly extending primary seal portion 68b,70b terminating in a lip 68c,70c in dynamic sealing contact with sidewall seal surface 52b,54b, and an axially and radially inwardly extending exclusion seal portion 68d,70d terminating in a lip 68e,70e also in dynamic sealing contact with seal surface 52b,54b. The bases of seals 68,70 are preferably, but not necessarily, joined by extrusion of the elastomeric material through a plurality of openings 56f in the clutch inner member during the molding process. Primary seal portions 68b,70b prevent egress or leakage of fluid from housing compartment 48a of the damper mechanism. Exclusion seal portions 68d, 70d prevent ingress of abrasive contaminants to the lips of the primary seal when the damper is used in relatively dry environments or of pressurized fluid when the damper is used in, for example, a torque converter housing. When the exclusion seals are unlubricated, their axial length is preferable less than that of the primary seals, to reduce seal drag torque and wear.

Further with respect to dynamic sealing of viscous damper and particularly a damper housing having relatively thin sidewalls, such as sidewalls 52,54, it has been found that the sidewalls separate axially due to centrifugal effects, thereby increasing the need for greater minimum amounts of initial or static seal compression to ensure sealing as the housing separates due to centrifugal effects. Such greater minimum seal compression increases seal drag torque at low rotational speeds and, in combination with seal compression added by manufacturing tolerance can result in excessively high seal drag torque, reduced seal life, and poor performance of the spring and viscous damper. Axial separation of the housing sidewalls is prevented and manufacturing tolerances are reduced, particularly in the area of seal surfaces 52b,54b, by structurally connecting the radially inner extent of the sidewalls together by a plurality of circumferentially spaced apart fasteners fingers or spacers 52e defined by tabs extending axially from sidewall 52 and secured to sidewall 54 by known means such as welding. The tabs extend through circumferentially extending openings 53 between splines 42a,56a of hub 42 and inner clutch member 56.

FIG. 5 illustrates an enlarged cross-section of a portion of an alternative molded seal assembly 72 including face seals 74,76 each having extended primary and exclusion seal portions 74a,74b, and 76a,76b to further reduce seal drag torque. Molded seal assemblies 66 and 72 simplify assembly of the damper mechanism since they are intergral with the clutch assembly and therefore are installed and properly positioned in one operational step with the clutch assembly. The molded seal assemblies are also axially compact while still being very flexible in the axial direction; hence, they reduce the axial space necessary to provide reliable sealing while at the same time reducing the effects of manufacturing tolerances which substantially vary seal compression and may dramatically increase seal drag torque. Further, the feature of an exclusion seal also protects the primary seal from early or premature failure due to abrasive contaminants.

Looking now at FIG. 6, therein is illustrated a method of assembling and rapidly filling damper mechanism 30 with a predetermined volume of silicone oil sufficient to ensure that thermal expansion of the oil does not over fill compartment 48a when the compartment volume is a minimum due to manufacturing tolerances and the oil volume is a maximum due to measuring tolerances, and to ensure a full fill of the shear chamber 64 when the shear volume is a maximum due to manufacturing tolerances and the oil volume is a minimum due to measuring tolerances.

Assembling and filling include positioning sidewall 52 of housing 48 on a support 78 with shear and seal surfaces 52a,52b facing upward and in a horizontal plane. Clutch assembly 50 is then positioned over sidewall 52 with seal 70 of seal assembly 66 resting on seal surface 52b and outer member shear surface 58a resting on sidewall shear surface 52a, thereby defining a trapped volume excessible via openings 58c between the inner and outer clutch members. This trapped volume, by design, has a capacity sufficient to receive the above mentioned predetermined volume of silicone oil for all tolerance conditions mentioned above without overflowing the upper surfaces 56a, 58d of inner and outer members 56,58. The silicone is readily injected into the trapped volume through openings 58c which are not receiving one of the splines or tabs 56b of the inner member. Sidewall 54 is then positioned with spacer flange 54c seated on a radially outer extent of shear surface 52a. The interface of the spacer flange and shear surface are then sealingly secured together by known methods. Since the silicone oil, contained in the trapped volume, is spaced a substantial distance from spacer flange 54c, any of several rapid welding methods may be used, e.g., resistance or laser welding.

A preferred embodiment of the invention has been disclose for illustrative purposes. Many variations and modifications of the preferred embodiment are believed to be within the spirit of the invention. The following claims are intended to cover the inventive portions of the preferred embodiment and variations and modifications within the spirit of the invention.

What is claimed is:

1. A torsion damping mechanism adapted for connection between input and output drives of a torque transmitting driveline; the mechanism comprising resilient means for drivingly interconnecting the drives and a viscous damper including annular housing and clutch assemblies adapted for rotation about a rotational axis of one of the drives; the housing assembly including first and second radially extending sidewalls having mutually facing sidewall surfaces defining an annular radially extending compartment having an open radially inner extent and a radially outer extent closed by means sealingly securing the sidewalls together, the housing adpated to be driven by one of the drives; the clutch assembly including radially outer and inner and portions, the outer portion having oppositely facing radially extending surfaces disposed in close axially spaced relation from the sidewall surfaces for viscous clutching coaction therewith via a viscous liquid in the compartment, the inner portion extending radially inward of the housing for driving connection to the one drive; dynamic seal means cooperating between the clutch inner portion and radially inner portions of the housing sidewalls for sealing the radially inner extent of the compartment; characterized by:

the clutch assembly including a plurality of circumferentially spaced apart openings extending therethrough; and the housing assembly having means including a plurality of fasteners freely extending through said openings and having opposite ends fixed to the housing sidewalls for preventing axial movement of the sidewalls relative to each other, the circumferentially spaced apart openings having an arc length allowing a predetermined amount of relative rotation between the housing and clutch assemblies.

2. The mechanism of claim 1, wherein said openings and fasteners are positioned between the seal means and the radially inner extent of the clutch assembly inner portion.

3. The mechanism of claim 1, wherein the first and second sidewalls of the housing assembly each have a radially extending seal surface axially facing and spaced from oppositely facing surfaces of the clutch inner portion; and a face seal formed of elastomeric material molded to each oppositely facing surface of the clutch inner portion, each seal having a base portion in static sealing relation with the associated inner portion surface, and each seal having a primary seal portion extending axially away from and radially outward from the base portion and terminating in a lip in dynamic sealing relation with the associated sidewall seal surface.

4. The mechanism of claim 3, wherein each molded seal also includes an exclusion seal portion extending axially away from and radially inward from the base portion and terminating in a lip in dynamic sealing relation with the associated sidewall seal surface.

5. The mechanism of claim 4, wherein the oppositely facing surfaces of the innner portion include a plurality of circumferentially spaced apart openings therethrough for joining the bases of the seals via elastomeric material extruded into the openings during molding of the seals.

6. A viscous shear mechanism including annular housing and clutch assemblies adapted for relative rotation about a common axis; the housing assembly including first and second annular, radially extending sidewalls having mutually facing sidewall surfaces defining an annular radially extending compartment; means sealing and securing the sidewalls against relative rotation and axial movement at the radially outer extend of the compartment; the clutch assembly including radially inner and outer portions, the outer portion having oppositely facing radially extending surfaces disposed in close axially spaced relation from the sidewall surfaces for viscous clutching coaction therebetween via a viscous shear liquid in the compartment, the inner portion extending radially inward of the housing for connection to a drive; axially facing dynamic seal means cooperating between radially inner portions of the sidewalls and oppositely facing sides of the clutch assembly for closing the radially inner extent of the compartment; characterized by:

the clutch assembly including a plurality of circumferentially spaced apart openings extending axially therethrough; and means for preventing relative axial movement of the radially inner portions of the sidewalls, the means for preventing including a plurality of fingers extending axially between the sidewalls and freely through the clutch assembly openings, the openings having arc lengths allowing a predetermined amount of relative rotation between the clutch assembly and the fingers.

7. The mechanism of claim 6, wherein the fingers are disposed radially inward of the dynamic seal means.

8. The mechanism of claim 6, wherein the fingers are affixed to the sidewalls.

9. The mechanism of claim 6, wherein dynamic seal means include first and second face seals each having a base portion in static sealing relation with one of the opposite sides of the clutch assembly and each having a lip in dynamic sealing relation with the radially inner portion of the sidewalls.

10. The mechanism of claim 9, wherein the first and second seals each include a primary seal portion extending axially away from and radially outward from the base portion and terminating in the lip.

11. The mechanism of claim 10, wherein the first and second seals each include an exclusion seal portion extending axially away from and radially inward from the base portion and terminating in a lip in dynamic sealing relation with the radially inner portions of the sidewalls.

12. The mechanism of claim 6, further including a spring damper having an input affixed to the annular housing assembly and an output connected to the drive which is connected to the clutch assembly inner portion.

13. The mechanism of claim 12, wherein the spring damper includes relatively stiff spring means for transmitting and attenuating torque between the input and output when the output is connected to a load, and relative less stiff spring means disposed in series with the stiff spring means and for attenuating torque between the drives when the output is not connected to a load.

14. The mechanism of claim 7, wherein the fingers are affixed to the sidewalls.

15. The mechanism of claim 7, wherein dynamic seal means include first and second face seals each having a base portion in static sealing relation with one of the opposite sides of the clutch assembly and each having a lip in dynamic sealing relation with the radially inner portion of the sidewalls.

16. The mechanism of claim 15, wherein the first and second seals each include a primary seal portion extending axially away from and radially outward from the base portion and terminating in the lip.

17. The mechanism of claim 16, wherein the first and second seals each include an exclusion seal portion extending axially from and radially inward from the base portion and terminating in a lip in dynamic sealing relation with the radially inner portions of the sidewalls.

18. The mechanism of claim 7, further including a spring damper having an input affixed to the annular housing assembly and an output connected to the drive which is connected to the clutch assembly inner portion.

19. The mechanism of claim 18, wherein the spring damper includes relatively stiff spring means for transmitting and attenuating torque between the input and output when the output is connected to a load, and relative less stiff spring means disposed in series with the stiff spring means and for attenuating torque between the drives when the output is not connected to a load.

* * * * *